(12) United States Patent
Guo et al.

(10) Patent No.: US 11,422,944 B2
(45) Date of Patent: Aug. 23, 2022

(54) ADDRESS TRANSLATION TECHNOLOGIES

(71) Applicant: Intel Corporation, Santa Clara, CA (US)

(72) Inventors: Kaijie Guo, Shanghai (CN); Weigang Li, Shanghai (CN); Junyuan Wang, Shanghai (CN); Liang Ma, Shannon (IE); Maksim Lukoshkov, Clarecastle (IE); Yao Huo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/989,667

(22) Filed: Aug. 10, 2020

(65) Prior Publication Data

US 2020/0371953 A1    Nov. 26, 2020

(51) Int. Cl.
*G06F 12/1009* (2016.01)
*H04L 61/2596* (2022.01)
(Continued)

(52) U.S. Cl.
CPC ...... *G06F 12/1009* (2013.01); *G06F 12/1027* (2013.01); *G06F 13/28* (2013.01);
(Continued)

(58) Field of Classification Search
CPC ............. G06F 12/1009; G06F 12/1027; G06F 12/1036; G06F 12/1081; G06F 13/28;
(Continued)

(56) References Cited

U.S. PATENT DOCUMENTS 8,312,468 B2 * 11/2012 Warton ............... G06F 12/1027
   718/108
9,524,248 B2 * 12/2016 Klein .................. G06F 12/1009
(Continued)

OTHER PUBLICATIONS

Amit, Nadav, et. al., "IOMMU: Strategies for Mitigating the IOTLB Bottleneck", HAL open science, https://hal.inria.fr/inria-00493752, Jun. 21, 2010, 13 pages.
(Continued)

*Primary Examiner* — Idriss N Alrobaye
*Assistant Examiner* — Richard B Franklin
(74) *Attorney, Agent, or Firm* — Compass IP Law PC

(57) ABSTRACT

Examples herein relate to a system that includes a first memory device; a second memory device; and an input-output memory management unit (IOMMU). The IOMMU can search for a virtual-to-physical address translation entry in a first table for a received virtual address and based on a virtual-to-physical address translation entry for the received virtual address not being present in the first table, search a second table for a virtual-to-physical address translation entry for the received virtual address, wherein the first table is stored in the first memory device and the second table is stored in the second memory device. In some examples, based on a virtual-to-physical address translation entry for the received virtual address not being present in the second table, a page table walk is performed to determine a virtual-to-physical address translation for the received virtual address. In some examples, the first table includes an IO translation lookaside buffer (IOTLB).

20 Claims, 11 Drawing Sheets

(51) Int. Cl.
*G06F 12/1027* (2016.01)
*G06F 13/28* (2006.01)
*G06F 13/42* (2006.01)

(52) U.S. Cl.
CPC ...... G06F 13/4282 (2013.01); H04L 61/2596 (2013.01); *G06F 2212/657* (2013.01); *G06F 2213/0026* (2013.01)

(58) Field of Classification Search
CPC ......... G06F 13/4282; G06F 2212/1016; G06F 2212/151; G06F 2212/657; G06F 2212/683; G06F 2213/0026; H04L 61/2596

See application file for complete search history.

(56) References Cited

U.S. PATENT DOCUMENTS

2007/0061549 A1    3/2007   Kaniyur et al.
2011/0022818 A1*   1/2011   Kegel ................. G06F 12/1009
                                                              711/206

OTHER PUBLICATIONS

Bhattacharjee Abhishek, "Appendix L: Advanced Concepts on Address Translation", Department of Computer Science, Rutgers University, Sep. 11, 2018, 69 pages.
Corner, Mark, "CMPSCI 377 Operating Systems", Lecture 15, Fall 2009, 2 pages.
Intel, Intel® Virtualization Technology for Directed I/O, Architecture Specification Revision 1.1, Sep. 2007, 148 pages.
Krause, Michael, et. al., "Address Translation Services", PCI-SIG Developers Conference 2006, 42 pages.

* cited by examiner

ADDRESS TRANSLATION TECHNOLOGIES

BACKGROUND

A memory management unit (MMU) can be used to convert a virtual address to a physical address, where the physical address is used to identify a memory address to read from or to which a write operation can be performed. An input-output memory management unit (IOMMU) can provide direct memory access (DMA) between a device and memory. A DMA operation can be a manner for an input/output (I/O) device to send or receive data directly to or from the main memory, without a central processing unit (CPU) managing the copy operation thereby freeing the CPU to perform other operations. The IOMMU can map virtual addresses to physical addresses.

DETAILED DESCRIPTION

Some solutions reduce the IO delay caused by nested page table walk by relying on an IO translation lookaside buffer (IOTLB) built inside an IOMMU to store a translation cache for fast lookup of virtual-to-physical address mappings to avoid a nested page walk by IOMMU when DMA requests associated with the same address translation arise in the future. An IOMMU translates an IO Virtual Address (IOVA) to a physical address. If a guest virtual machine (VM) requests a memory access, IOVA can be a guest physical address so that the IOMMU can translate a guest virtual address (GVA) (as IOVA) to host physical address (HPA). In a host VM requests a memory access, the IOVA can be an host physical address.

Extended IOMMU offers a Shared Virtual Memory (SVM) function that allows input-output devices to utilize a guest virtual address (GVA) for DMA requests (e.g., read from or write to memory). A potential benefit of SVM is to reduce complexity for user space applications by avoiding a need to convert a virtual address of a process to a physical address. With SVM, an application is able to use a guest virtual address if executed in a guest VM, or a host virtual address if executed in a host. To translate a GVA to host physical address (HPA), the IOMMU can perform nested translation by looking to both first level and second level page tables (e.g., using Intel® Virtualization Technology for Directed I/O (VT-d) page tables). The nested page table walk incurs latency in completing a DMA request, as a complete page walk can consume dozens of memory lookup and time complexity is $O(N^2)$, where N is the depth of page table structure.

Figure 1:
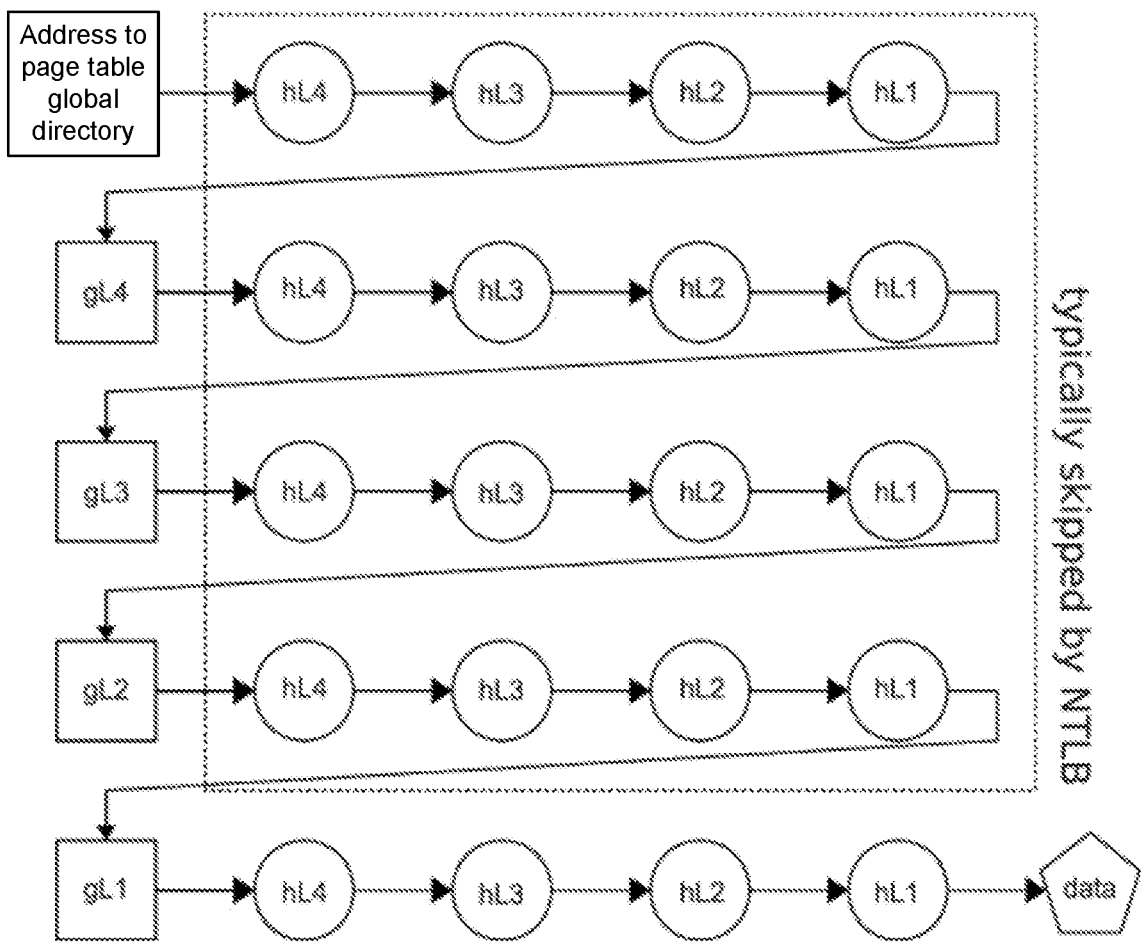
FIG. 1 shows an example of 4-level page structure.

FIG. 1 shows an example of 4-level page structure. Specifically, FIG. 1 illustrates a worst case cost of a nested page table walk involving translating a guest virtual address (GVA) to a host physical address (HPA). For example, hL4 can be a level 4 page table of a host operating system, hL3 can be a level 3 page table of a host operating system, and so forth. Host level page tables can translate a guest level address contained in a guest level page table. For example, gL4 can represent a level 4 guest page table, gL3 can represent a level 3 guest page table, and so forth. In this example, 24 memory lookups are needed to provide a host physical address to access the data.

Some platforms may implement First-Level Page Walk Cache (FLPWC) or Second-Level Page Walk Cache (SLPWC) to reduce the overall time for a nested virtual-to-physical address translation. However, FLPWC and SLPWC can still latency and cannot prevent unnecessary nested translation completely.

A quality of service (QoS) for IOMMU Page Walk Tracker (PWTRK) can be used to reduce overhead of page walks on the same address. QoS for PWTRK can prioritize the use of page walker tracker only but does not prioritize the use of IOTLB.

Figure 2:
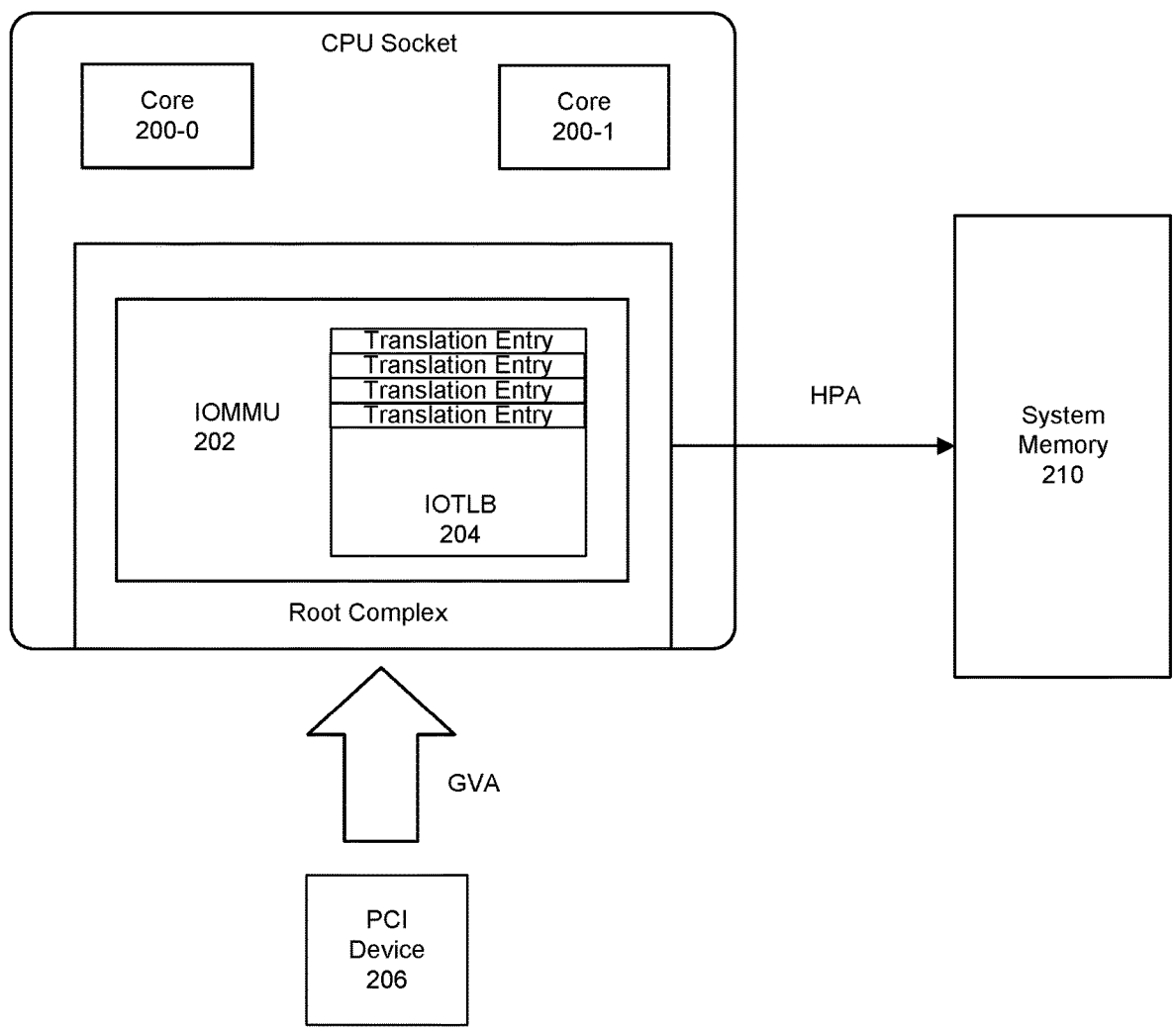
FIG. 2 depicts an example of IOTLB use by an IOMMU.

FIG. 2 depicts an example of IOTLB use by an IOMMU. IOMMU 202 can support address translation service (ATS) and implement IOMMU translation lookaside buffer (TLB), so that IOTLB 204 of IOMMU 202 is performed using a TLB of IOMMU 202 to translate a GVA to an HPA. A device manufacturer can implement its own address translation (AT) and TLB hardware, adding cost to device manufacturing even though the AT and TLB is not necessarily supported by all PCIe devices.

In some examples, a size of IOTLB 204 can be increased to provide more translations of virtual-to-physical addresses and avoid page table walking. A size of IOTLB 204 depends on the density of integrated chip design, and larger a TLB size adds cost to central processing unit (CPU) manufacturing. In addition, the size of IOTLB 204 could still be insufficient to store enough translations in a complicated computing environment. However, IOTLB 204 may not be scalable with a number of devices such as devices in a cloud environment or I/O devices. The number of cores (e.g., cores 200-0 and 200-1) per socket is rising in modern CPU architecture. In highly dense cloud environment (e.g., artificial intelligence (AI) cluster) where dozens of tenants running their virtual machines (VMs) connect to hundreds of PCIe endpoints in a single socket, the devices/VMs share the limited IOTLB 204 of IOMMU 202 in the root complex, which can easily cause congestion and overuse of IOTLB 204.

When congestion causes IOTLB 204 starving of free TLB entries, IOMMU 202 may invalidate some of the useful translations even if they are valid and under use by application. These applications may suffer I/O performance drop significantly due to translations not being stored in IOTLB 294 which can cause redundant nested translation.

Some IOMMU hardware does not provide quality of service (QoS) for IOTLB sharing. For example, in a multi-tenant environment or a public cloud, a malicious VM or non-malicious VM could saturate an entire IOMMU IOTLB with the device controlled by it, thus leaving little space in the IOTLB for translations for devices used by other tenants, thereby reducing other tenants' I/O performance.

Various embodiments provide for a secondary cache for address translation entries in addition to use of an IOTLB. For example, if the IOTLB completely full and no new entries can be added to the IOTLB for a particular requester, system software can create a translation, invalidate a not-commonly-used entry in IOTLB (e.g., cold entry) to store new translation, and store the translation in the invalidated entry. The invalidated entry can be placed into a translation table stored in memory (e.g., volatile or non-volatile memory). In some examples, translation table can be allocated per Process Address Space ID (PASID). The translation table for a PASID can include a pointer to an address translation table in a secondary cache. An entry in the address translation table can provide a translation of a virtual address (e.g., guest virtual address (GVA) or host virtual address (HVA)) to a host physical address (HPA). By making a secondary cache available for use to provide accesses to address translation entries, IOMMU performance can be increased despite congestion in the IOTLB, by making the IOTLB scalable by addition of a secondary cache that can increase in size and support increasing numbers of I/O devices especially for cloud uses, without increasing IOTLB size.

According to various embodiments, if the IOMMU receives a DMA request to translate a virtual address, the IOMMU first looks in the IOTLB. If a translation of the virtual address to a physical address is available in the IOTLB, then the IOMMU can access the translation from the IOTLB. If the IOTLB does not include the translation, the IOMMU can access an IOMMU Root Table, Lower Context Table and PASID Table to find a PASID table entry corresponding to the PASID associated with the request to translate a virtual address. Various embodiments cause the IOMMU to lookup entries from the secondary cache and restore an address translation in the IOTLB.

According to various embodiments, the time complexity to recover translation cache from the secondary cache into the IOTLB can be reduced to O(1) or O(N), where O represents an upper bound and N represents a level of a page table, but depending on the hardware implementation, compared with an unnecessary nested translation which is $O(N^2)$. Various embodiments provide the secondary cache as a valid translation cache stored in system random access memory. An address translation table can be stored in memory and the address translation table can include a Stashed Translation Table (STT) as a secondary cache for address translation. Various embodiments can extend existing VT-d hardware and VT-d PASID table structure, in order to identify a location of the address translation table. For example, a PASID table can be accessed by the IOMMU to identify an entry that indicates a location of an address translation table in memory for a particular PASID.

According to various embodiments, the entry in the address translation table can include an IOTLB_QoS field, so that a number of IOTLB entries or STT entries consumed by a device, application, or VM is controllable. This can prevent abuse of IOTLB by malicious tenant or overuse of IOTLB or STT entries by a device, application, or VM by limiting the number of IOTLB entries used by a device, application, or VM according to their priority.

Figure 3:
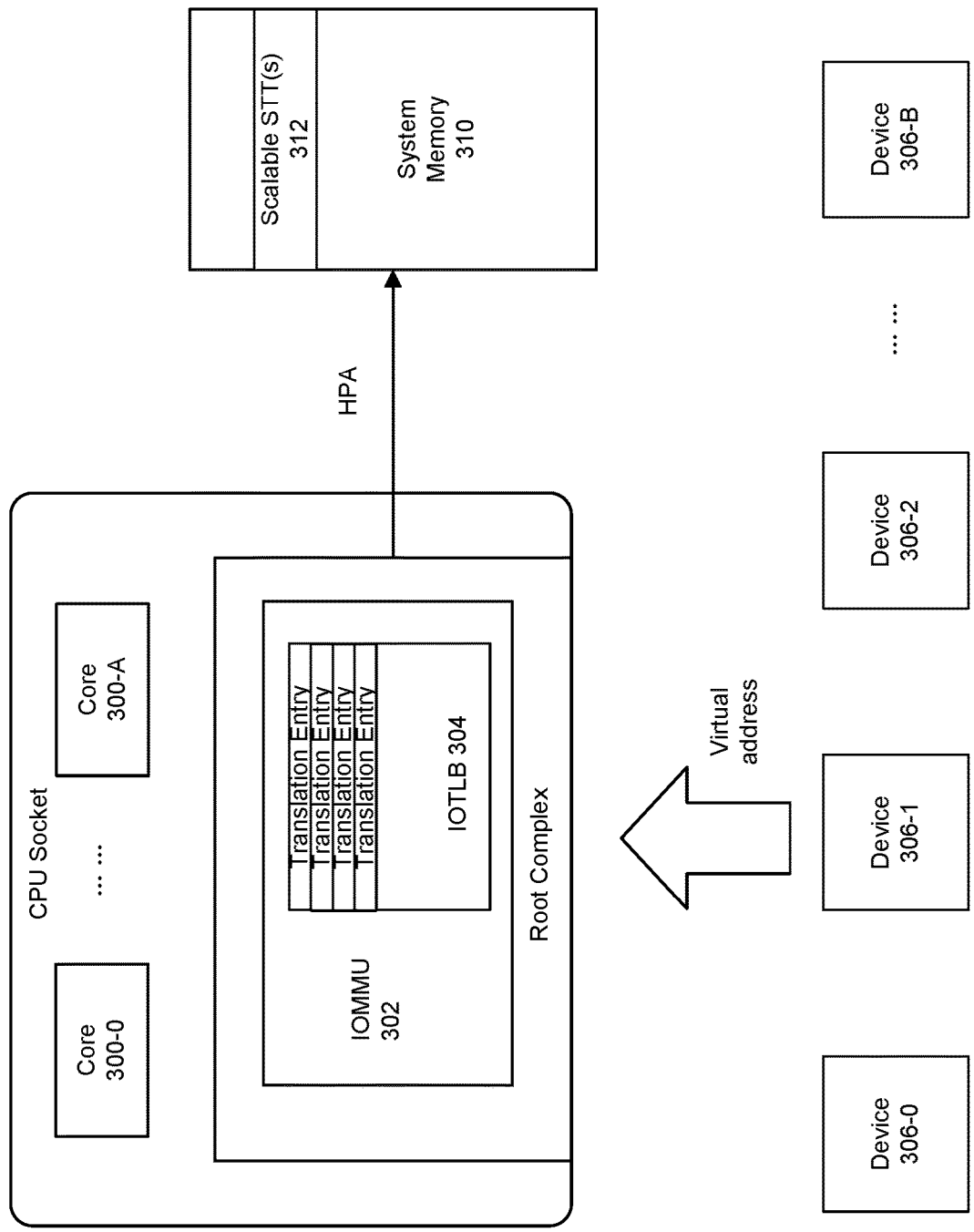
FIG. 3 shows an example system that can use a secondary cache to store address translation entries outside of the IOTLB.

FIG. 3 shows an example system that can use a secondary cache to store address translation entries outside of the IOTLB. In this example, a CPU socket can include cores 300-0 to 300-A, where A is an integer ≥1. The CPU socket can also include or access IOMMU 302. In this example, a number of address translations the system can store exceeds the number of translation entries in IOTLB 304. IOTLB 304 can be extend into scalable in-memory STTs 312 when all of the entries in IOTLB 304 are used or under high pressure (e.g., little free space available in IOTLB 304).

Any device 306-0 to 306-B (e.g., device connected using a PCIe interface) (where B is an integer ≥3), application, VM, or container can issue a read or write request for content from memory. The read or write request can include a virtual address (e.g., GVA or HVA) and PASID. Where a virtual-to-physical address translation entry is present in IOTLB 304, IOMMU 302 can provide an HPA to use to complete the read or write request. A memory controller (not shown) can read the data from the HPA or write data to the HPA in memory. Where IOTLB 304 does not store a translation entry, IOMMU 302 can first check if a PASID Table (described in more detail later) indicates an STT is allocated for a virtual address and PASID combination. If there is an STT allocated for the virtual address and PASID combination, IOMMU 302 can determine if a virtual-to-physical translation is available in STTs 312. If there is an address translation available, then the translation can be accessed and used to determine an HPA to use for the read or write request. Moreover, in some examples, the translation from STTs 312 can be stored in an entry in IOTLB 304. However, if STT 312 does not include the address translation, then a page walk can be performed to identify the page table entry (PTE) indicating a physical address corresponding to the virtual address.

In connection with a DMA request from a device (e.g., one of devices 306-0 to 306-B) or a memory access request (e.g., read or write), if an address translation is not present in IOTLB 304 and a IOTLB miss occurs, IOMMU 302 can locate the PASID entry by requestor ID and PASID and retrieves an STT pointer to a relevant STT 312 from the PASID entry. When a PCIe interface is used, a requestor ID can include bus, device and function (BDF) information. IOMMU 302 can perform translation record lookup inside an STT 312 using a virtual address as a key. If such translation record exists in STT 312, IOMMU 302 can load the record into IOTLB 304 and use the record to translate an address in the memory read or write request (e.g., DMA request).

According to some embodiments, time complexity for virtual-to-physical lookup can be constant (e.g., O(1)) depending on a hardware implementation, and a multi-level page table structure need not be implemented given the number of entries is limited only to a PASID/device.

Figure 4:
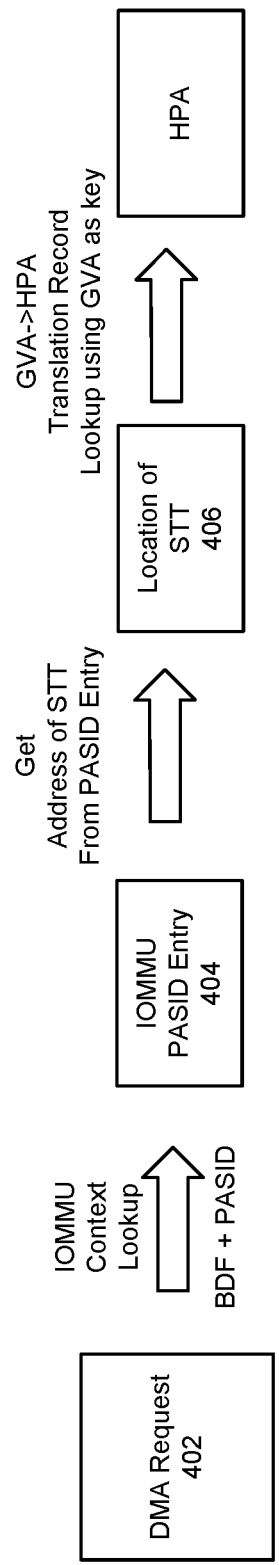
FIG. 4 depicts an example of a process to recover a translated record.

FIG. 4 depicts an example of a process to recover a translated record. This process can occur if the IOMMU does not locate a translation entry for a virtual address (e.g., GVA or HVA) in the IOTLB. For example, a DMA request 402 can be received at an IOMMU from a device (e.g., any PCIe connected device or device connected using any connection), application, VM or container. The DMA request 402 can include a bus device and function (BDF) in accordance with PCIe and a PASID to identify the requester. An IOMMU context lookup can occur to retrieve an IOMMU PASID entry 404 based on the PASID. The IOMMU can use the BDF and PASID to perform a context lookup in a root table and lower context table to identify a PASID table for the requester. An entry in the PASID table corresponding to the PASID can be used to identify a location (address) of the STT 406. The IOMMU can find a match for the virtual address in the STT to identify an HPA corresponding to the virtual address.

Figure 5:
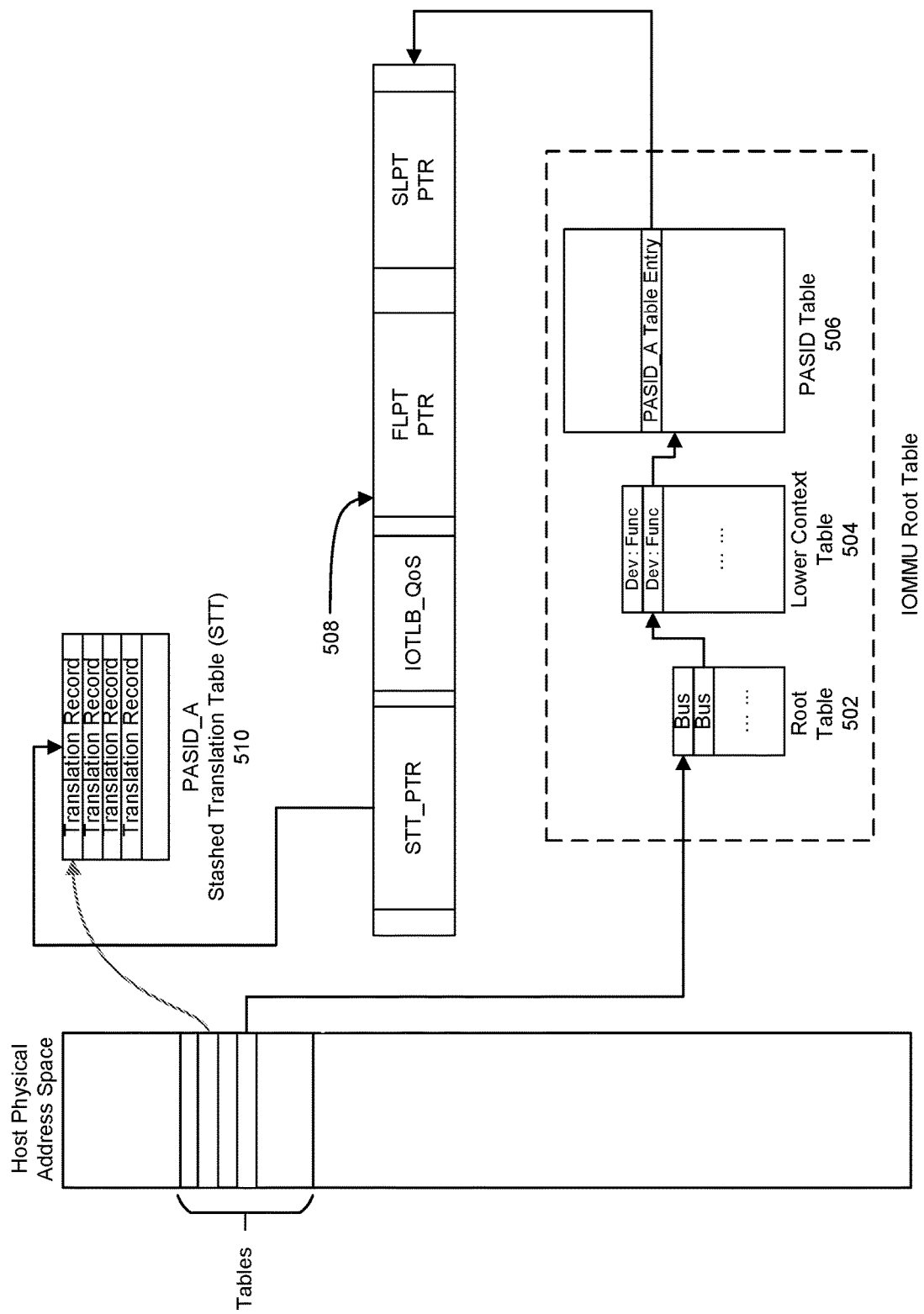
FIG. 5 depicts an example of accessing a PASID table entry.

FIG. 5 depicts an example manner of accessing a PASID table entry. When a device is initialized, a hypervisor can create entries in Root Table 502, Lower Context Table 504, and PASID Table 506 as well as fields Stashed Translation Table Pointer (STT_PTR) and IOTLB_QoS in entries in a PASID Table 506. PASID Table 506 can include Table Entries for different PASIDs. In accordance with various embodiments, a table entry 508 can include fields Stashed Translation Table Pointer (STT_PTR) and IOTLB_QoS. Field Stashed Translation Table Pointer (STT_PTR) can be used to record a physical address in host physical memory address space of a per PASID Stashed-Translation-Table (STT) 510. In some example, STT 510 can be allocated for a particular PASID. STT 510 can be stored in extra space in a contiguous pinned memory region inside host VT-d management memory or other memory or storage. A hypervisor can be responsible for allocating and managing STT 510 for at least some PASID contexts. The translation record can include a translation from HVA, GVA, or IO virtual address (IOVA) to HPA as well as other relevant information. In some examples, STT 510 can store valid translation entries evicted from the IOTLB due to the IOTLB being full.

Field IOTLB_QoS can be used to inform IOMMU the priority of a PASID. The IOMMU can determine how many IOTLB translation entries or Translation Records in STT 510 can be assigned to a specific PASID based on the priority field. For example, at initialization, a maximum number of IOTLB entries and Translation Records can be determined for a tenant or device PASID based on priority of tenant or device PASID. A higher priority can permit more entries than a lower priority. Field IOTLB_QoS can indicate how many entries can be allocated based on a priority or replacement policy so that translation entries used by higher priority PASIDs in IOTLB are more likely to replace translation entries used by lower priority PASIDs in IOTLB when the IOTLB is full. A hypervisor may apply per-process PASID QoS to limit entries allocated per PASID in the IOTLB.

According to some embodiments, for a miss in the IOTLB (e.g., lack of physical address translation for a provided virtual address), the IOMMU does not perform a page walk but attempts to retrieve PASID table 506 to determine if a Translation Record in host physical address space (e.g., in DRAM) is available. If a Translation Record is available for the virtual address, the IOMMU can restore the translation entry into the IOTLB subject to a limit on number of translation entries that can be stored in the IOTLB for an associated PASID.

To lookup STT 510 for a PASID, IOMMU can use Root Table 502 in memory to find bus device function (PCIe) in a Lower Context Table 504 for the PASID and virtual address. Lower Context Table 504 can include a pointer to Dev:Func, which can represent a device function or PCIe identity. Entry Dev:Func can include a pointer to a PASID entry for the PASID in PASID Table 506. In this example, PASID_A Table Entry corresponds to a PASID from the requester. In PASID_A Table Entry, field STT_PTR refers to a memory address for STT 510. In some examples, the IOMMU can cache a memory address of STT 510 for a PASID to avoid lookup of the STT_PTR.

In some examples, STT 510 stores translation records invalidated due to IOTLB being full and needing to make space for another translation record or a PASID having exceeded its limit for entries in IOTLB. In some examples, other reasons of entry invalidation such as physical memory swap or memory freed by user may not cause such invalidated entry to be stored in STT 510.

In some examples, a change of physical address of user buffer (e.g., swapping) will cause invalidation of IOMMU TLB including STT. However, some user space drivers, as well as Data Plane applications such as Data Plane Development Kit (DPDK) can use PINNED IO memory as a DMA buffer.

Use of STT 510 can significantly reduce the IOMMU delay spent on duplicated nested translation in the situation of heavy IOTLB congestion. Moreover, the number of cached address translation entries can become scalable with the number of VM/device attached to the system.

Figure 6:
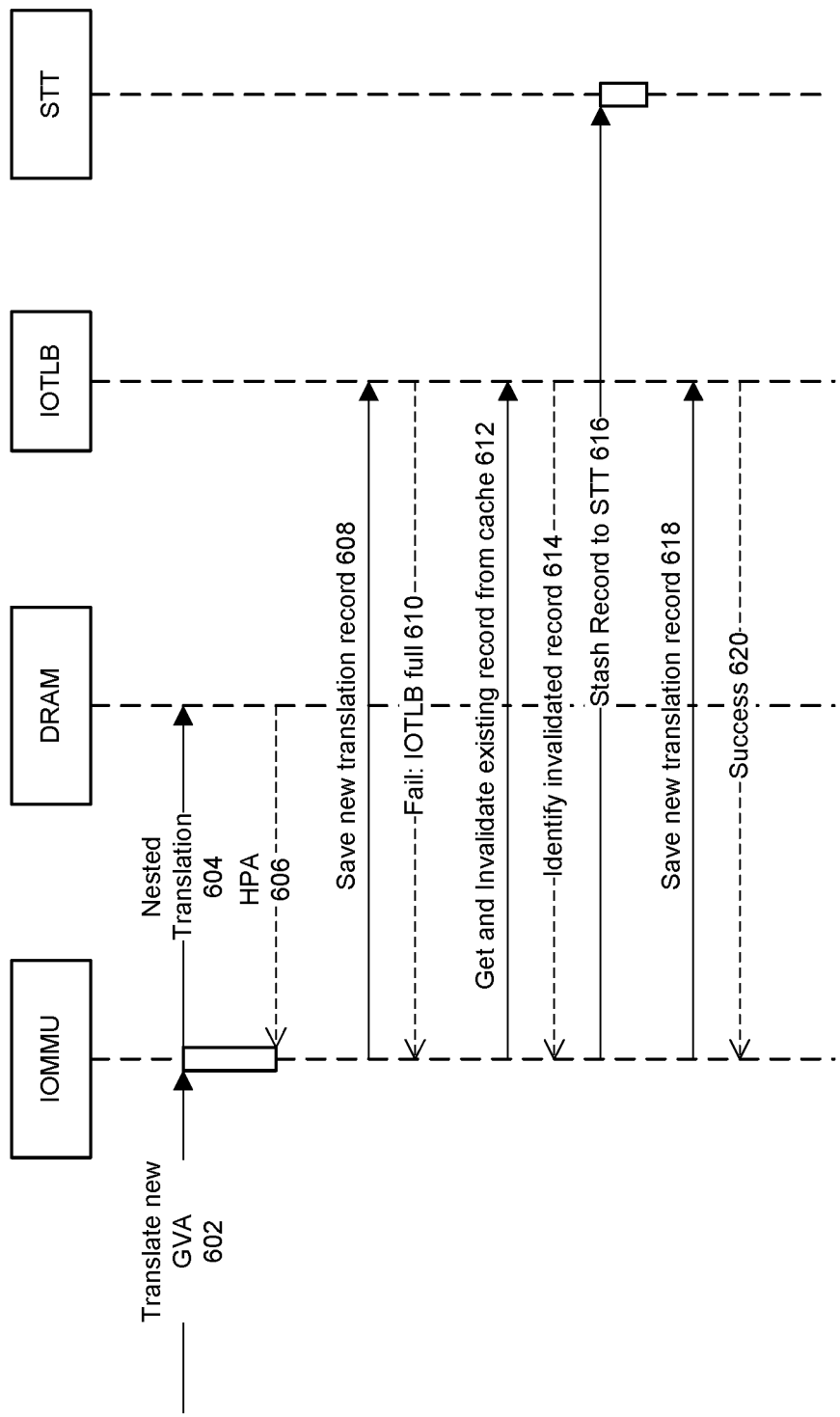
FIG. 6 depicts a sequence diagram showing example system interaction of translation cache stashing, and translation cache restoring.

FIG. 6 depicts a sequence diagram showing example system interaction of translation cache stashing and translation cache restoring. At 602, the IOMMU receives a memory access request containing a virtual address (e.g., GVA or HVA) from device A and determines a nested translation to HPA is to be performed. The memory access request can be in connection with a DMA read operation from a source address or write operation to a destination address. At 604, the IOMMU performs address translation according to the PASID and IOMMU PASID entry of the device A. At 606, the IOMMU receives the HPA translation and at 608, stores this HPA translation to the IOTLB. At 610, if the IOTLB is full at the moment, the IOMMU can create available space in IOTLB for this translation. For example, at 612, the IOMMU can identify a relatively cold cache entry (e.g., not frequently used) in the IOTLB and invalidate the identified record. For example, the invalidated cold cache record can be selected as a translation record belonging to another device, device B. However, the cache record may be selected for the same device A or same PASID. At 614, the IOMMU can find the PASID entry of the device B and locate the address of the STT for the PASID for device B. At 616, the IOMMU can store the evicted translation record from IOTLB into STT for the PASID for device B. At 618, the new translation record can be stored in place of the evicted record. At 620, success can be indicated to the IOMMU.

Figure 7:
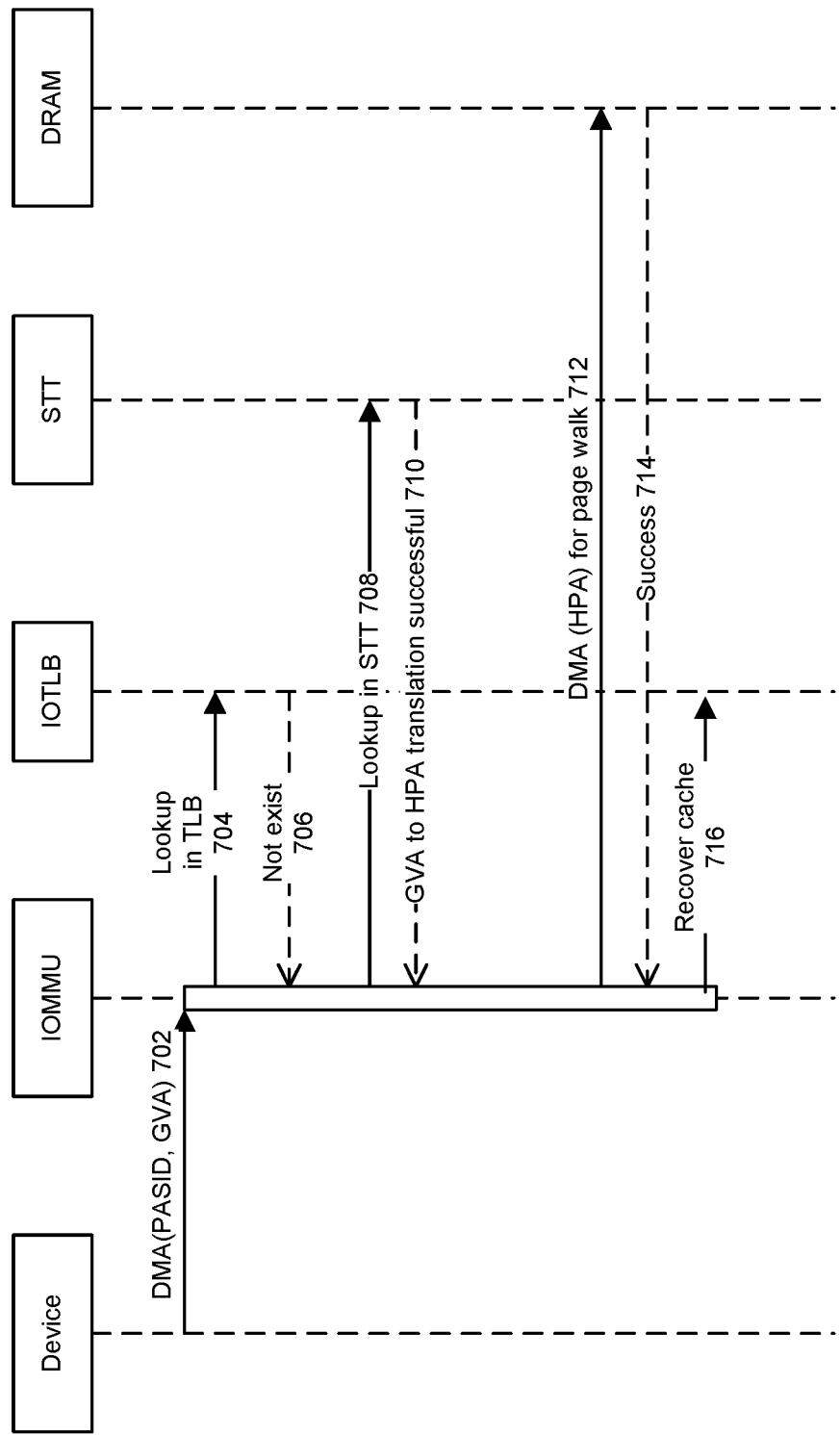
FIG. 7 shows an example for recovery of a translation record.

FIG. 7 shows an example for recovery of a translation record. At 702, Device B sends DMA request containing a PASID and virtual address (e.g., GVA or HVA) for an address translation. In some examples, the translation corresponding to the PASID and virtual address was previously removed from the IOTLB. At 704, a lookup is performed in the IOTLB. At 706, if the IOMMU determines there is no translation cache entry available in the IOTLB for the evicted translation corresponding to the virtual address, instead of performing nested translation (e.g., a page walk), at 708, IOMMU further looks into an STT for device B. At 710, IOMMU finds the translation record for the virtual address exists in the STT and retrieves the record from the STT. But if the translation record is not present in the STT, then at 712 a page walk is performed to locate the virtual address to HPA translation and at 714 a success is returned to the IOMMU. Optionally, at 716, the IOMMU may choose to recover this record from STT or page walk into IOTLB as this record is no longer cold data. IOMMU can use the translated HPA to complete the DMA request.

Figure 8:
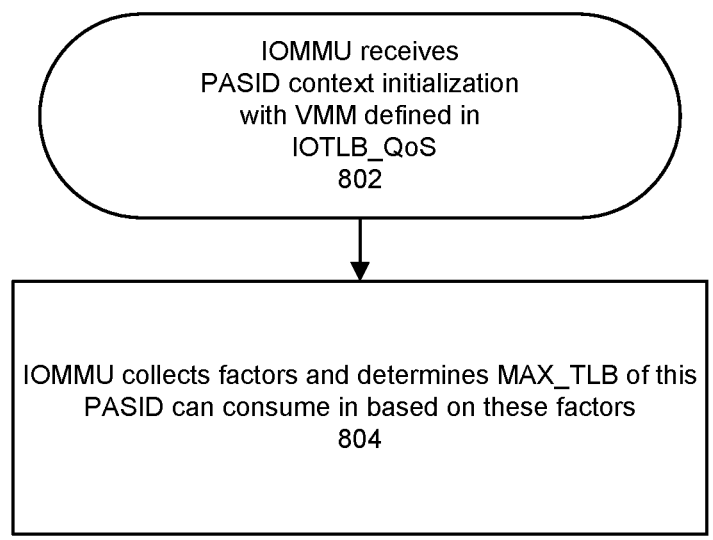
FIG. 8 depicts an example process to set a maximum number of translation entries for a PASID.

FIG. 8 depicts an example process to set a maximum number of translation entries for a PASID. At 802, upon initialization of a PASID context, IOMMU determines the maximum number of entries (MAX_TLB) in IOTLB that a PASID of a device can consume based on a value in the IOTLB_QoS field and other factors. For example, a hypervisor or virtual machine monitor (VMM) can configure the IOTLB_QoS field for each PASID value. At 804, the IOMMU collects factors and determines a maximum number of TLB entries (MAX_TLB) for a PASID based on the factors. The factors can include total IOTLB capacity of IOMMU, priority (indicated by IOTLB_QoS) of this PASID, or utilization rate of IOTLB by a PASID. Each PASID of a PCIe device therefore is restricted by MAX_TLB for the number of entries in the IOTLB it can consume.

Figure 9:
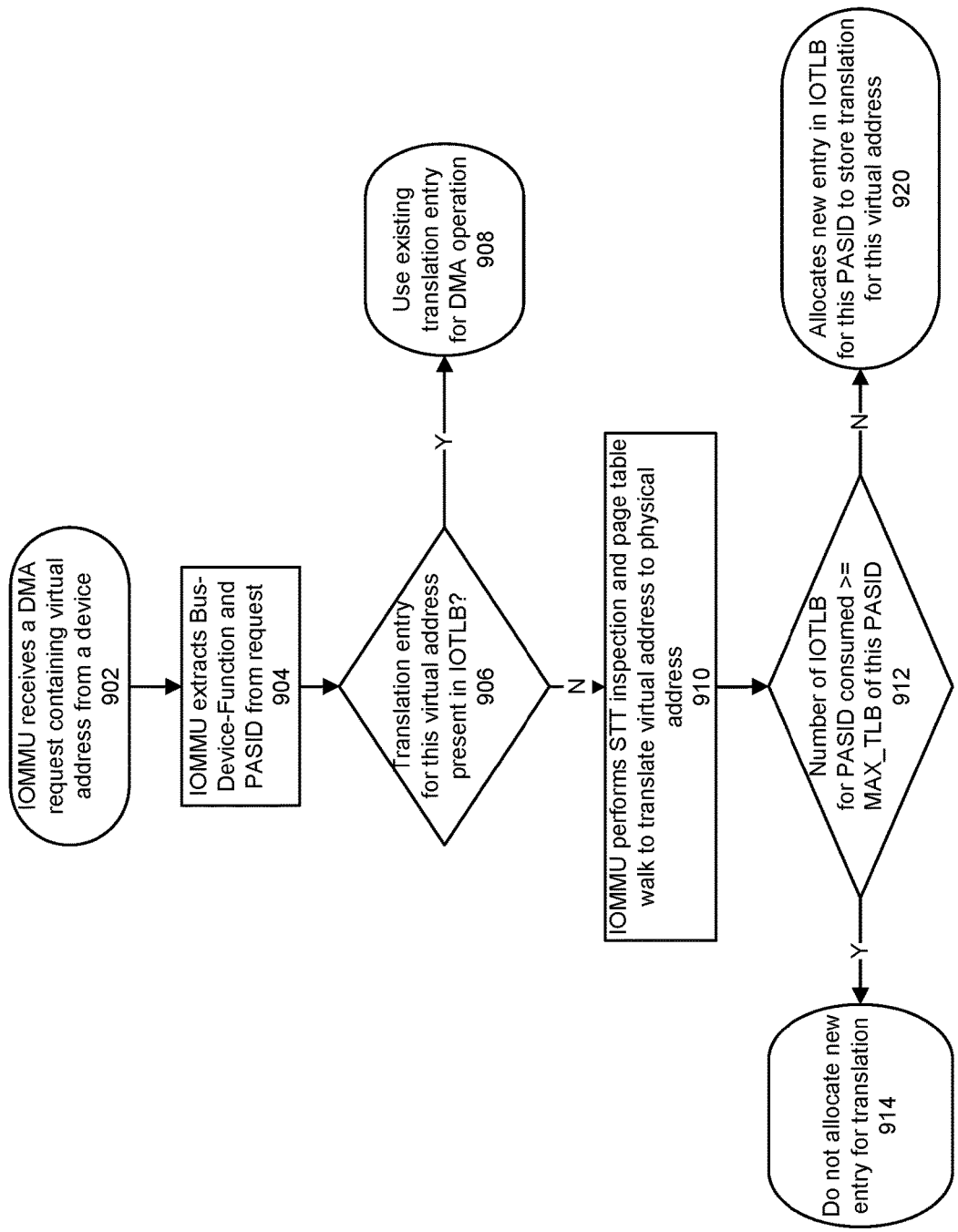
FIG. 9 shows an example operation of an IOMMU to regulate the IOTLB allocation and restriction for a device.

FIG. 9 shows an example operation of an IOMMU to regulate the IOTLB allocation and restriction for a device. At 902, an IOMMU receives a DMA request containing virtual address from a device. Although the example is provided with respect to DMA, a DMA operation need not be performed and any memory address access operation involving the CPU or OS can be performed. At 904, the IOMMU extracts Bus-Device-Function (BFD) and PASID from the request. At 906, a determination is made by the IOMMU if a translation cache entry for this virtual address is present in the IOTLB. If the translation cache entry is present in the IOTLB, the process continues to 908, where an existing translation cache entry is used to translate a virtual address to a physical address.

If the translation cache entry is not present in the IOTLB, the process continues to 910. At 910, the IOMMU can perform STT inspection to determine if the translation is available in the STT. If the translation is not available in the STT, the IOMMU can perform a page walk to translate the virtual address to a physical address.

At 912, a determination is made if a number of IOTLB entries consumed for the PASID is greater than or equal to a MAX_TLB for the PASID. If a number of IOTLB entries consumed or used for the PASID is greater than or equal to a MAX_TLB for the PASID, the process continues to 914. At 914, a new entry is not allocated in the IOTLB for the translation. A number of IOTLB that this PASID can consume has reached its limit. For example, the IOMMU can invalidate an existing cold cache entry of the same PASID and stores a new translation. In other examples, the IOMMU can store an entry in an STT for the PASID.

At 912, if a number of IOTLB entries consumed for the PASID is less than a MAX_TLB for the PASID, the process continues to 920. At 920, the IOMMU can allocate a new entry in the IOTLB for the PASID to store a virtual to physical address translation.

Figure 10:
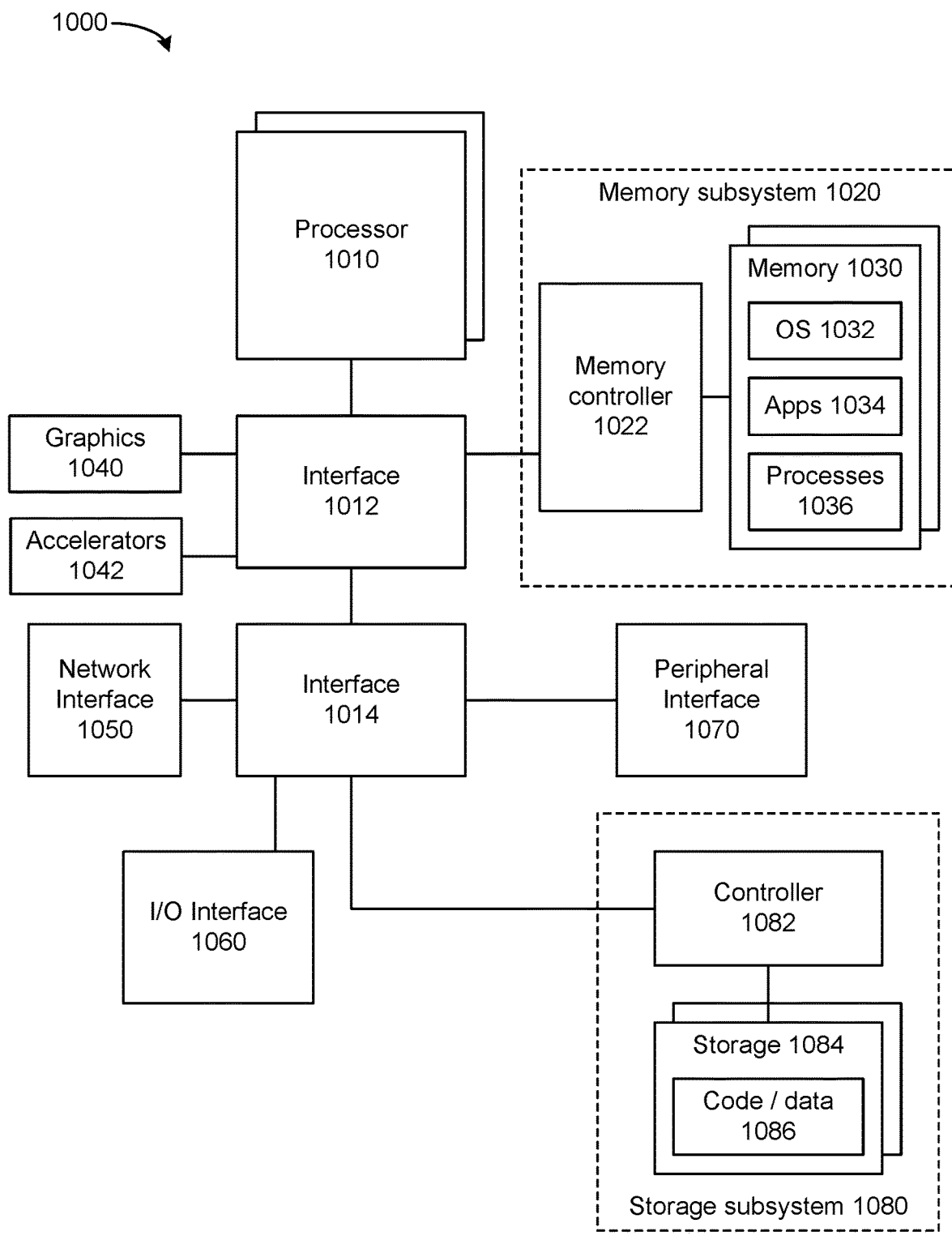
FIG. 10 depicts a system.

FIG. 10 depicts a system. The system can use embodiments described herein to provide address translation for devices such as devices connected through PCIe or other device-to-device connection (e.g., network interface card, graphics processors, video encoder or decoder, accelerator device, memory, storage, memory controller, storage controller, or application or virtual machine, and so forth). System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function offload engine that can be accessed or used by a processor 1010. Accelerators 1042 can be coupled to processor 1010 using a memory interface (e.g., DDR4 and DDR5) or using any networking or connection standard described herein. For example, an accelerator among accelerators 1042 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030.

Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 1050 can receive data from a remote device, which can include storing received data into memory. Various embodiments can be used in connection with network interface 1050, processor 1010, and memory subsystem 1020.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory can involve refreshing the data stored in the device to maintain state. One example of dynamic volatile memory includes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects between components can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 11:
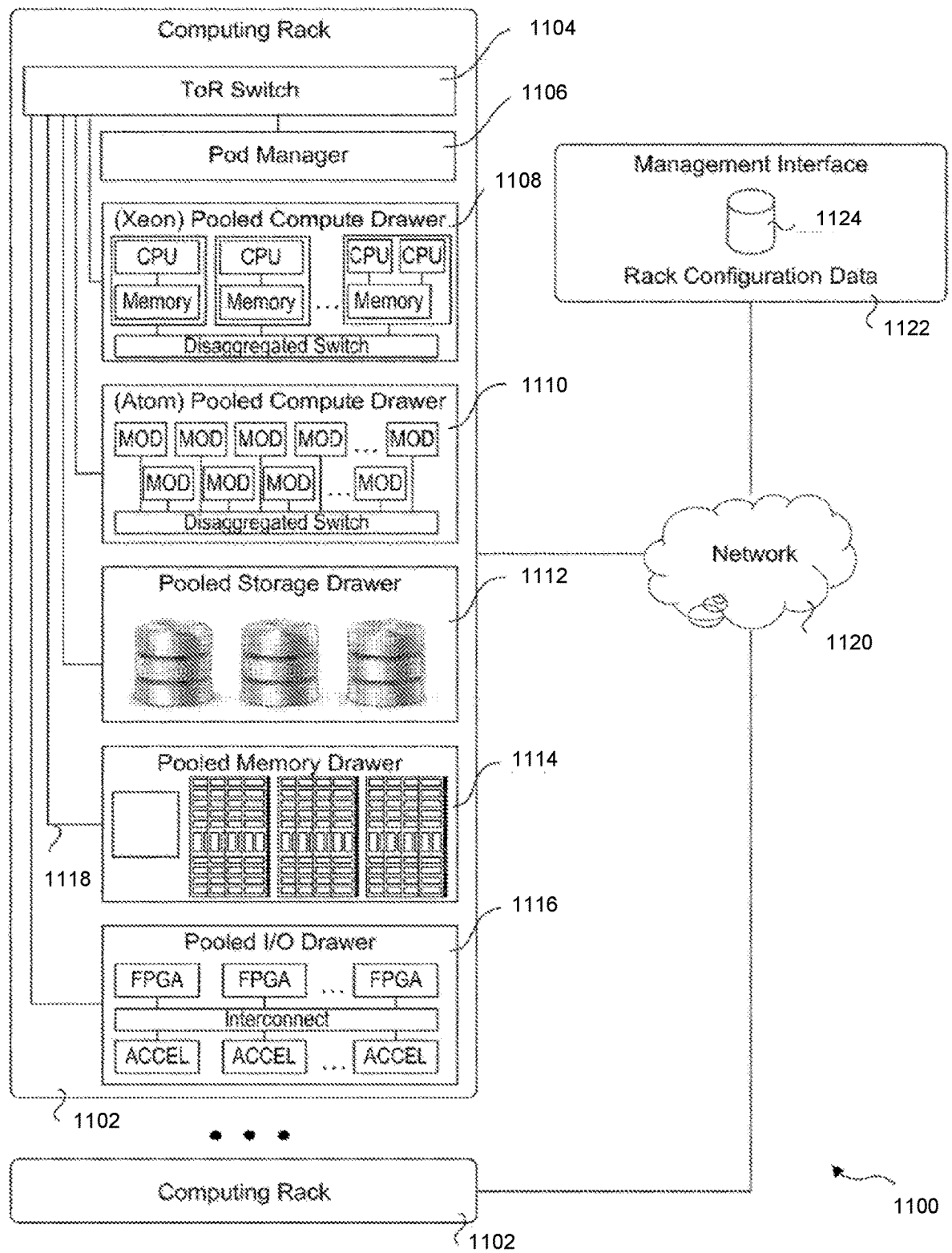
FIG. 11 depicts an example environment.

FIG. 11 depicts an environment 1100 includes multiple computing racks 1102, some including a Top of Rack (ToR) switch 1104, a pod manager 1106, and a plurality of pooled system drawers. Various embodiments can be used with address translation technologies described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1108, and Intel® ATOM™ pooled compute drawer 1110, a pooled storage drawer 1112, a pooled memory drawer 1114, and a pooled I/O drawer 1116. Some of the pooled system drawers is connected to ToR switch 1104 via a high-speed link 1118, such as a 40 Gigabit/second (Gb/s) or 100 Gb/s Ethernet link or a 100+Gb/s Silicon Photonics (SiPh) optical link. In one embodiment high-speed link 1118 comprises an 800 Gb/s SiPh optical link.

Multiple of the computing racks 1102 may be interconnected via their ToR switches 1104 (e.g., to a pod-level switch or data center switch), as illustrated by connections to a network 1120. In some embodiments, groups of computing racks 1102 are managed as separate pods via pod manager(s) 1106. In one embodiment, a single pod manager is used to manage racks in the pod. Alternatively, distributed pod managers may be used for pod management operations.

Environment 1100 further includes a management interface 1122 that is used to manage various aspects of the environment. This includes managing rack configuration, with corresponding parameters stored as rack configuration data 1124.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes an apparatus comprising: a first memory device; a second memory device; and an input-output memory management unit (IOMMU) to: search for a virtual-to-physical address translation entry in a first table for a received virtual address and based on a virtual-to-physical address translation entry for the received virtual address not being present in the first table, search a second table for a virtual-to-physical address translation entry for the received virtual address, wherein the first table is stored in the first memory device and the second table is stored in the second memory device.

Example 2 includes any example, wherein the IOMMU is to: based on a virtual-to-physical address translation entry for the received virtual address not being present in the second table, perform a page table walk to determine a virtual-to-physical address translation for the received virtual address.

Example 3 includes any example, wherein the first table comprises an IO translation lookaside buffer (IOTLB).

Example 4 includes any example, wherein the IOMMU is to: provide the virtual-to-physical address translation entry for the received virtual address for storage in the first table; based on the first table being full, invalidate an entry in the first table and store the virtual-to-physical address translation entry for the received virtual address using the invalidated entry in the first table; and store the invalidated entry in the second table.

Example 5 includes any example, wherein the IOMMU is to limit a number of entries permitted to be stored in the first table and the second table for a source of the received virtual address based on a priority level of a source of the received virtual address.

Example 6 includes any example, wherein the IOMMU is to: receive a Process Address Space ID (PASID); determine a memory address of the second table based at least on the PASID; and access the second table based on the memory address.

Example 7 includes any example, wherein the IOMMU is to: receive a memory access request associated with the received virtual address and PASID from a device, application, or virtual machine.

Example 8 includes any example, and includes one or more of: a server, rack, or data center, the one or more of a server, rack, or data center to write data to a memory or storage device using the virtual-to-physical address translation or read data from the memory or storage device using the virtual-to-physical address translation.

Example 9 includes any example, and includes a method that includes receiving a virtual address with a memory access request; searching, by an input-output memory management unit (IOMMU), for a virtual-to-physical address translation entry in a first table for the received virtual address; and based on a virtual-to-physical address translation entry for the received virtual address not being present in the first table, searching, by the IOMMU, a second table for a virtual-to-physical address translation entry for the received virtual address, wherein the first table is stored in a different memory device than a memory device that stores the second table.

Example 10 includes any example, and includes based on a virtual-to-physical address translation entry for the received virtual address not being present in the second table, performing, by the IOMMU, a page table walk to determine a virtual-to-physical address translation for the received virtual address.

Example 11 includes any example, wherein the first table comprises an IO translation lookaside buffer (IOTLB).

Example 12 includes any example, wherein the second table is stored in a memory device that is accessible to the IOMMU.

Example 13 includes any example, and includes providing the virtual-to-physical address translation entry for the received virtual address for inclusion in the first table; based on the first table being full, invalidating an entry in the first table and storing the virtual-to-physical address translation entry for the received virtual address using the invalidated entry in the first table; and storing a virtual-to-physical address translation for the invalidated entry in the second table.

Example 14 includes any example, and includes limiting a number of entries permitted to be stored in the first table and the second table for a source of the received virtual address based on a priority level of a source of the received virtual address.

Example 15 includes any example, and includes receiving a Process Address Space ID (PASID) with the memory access request; determining a memory address of the second table based at least on the PASID; accessing the second table based on the determined memory address.

Example 16 includes any example, and includes receiving the memory access request from a device, application, or virtual machine.

Example 17 includes any example, and includes a non-transitory computer-readable medium comprising instructions stored-thereon, that if executed by one or more processors of an input-output memory management unit (IOMMU), cause the one or more processors to: search for a virtual-to-physical address translation entry in a first table for a received virtual address and based on a virtual-to-physical address translation entry for the received virtual address not being present in the first table, search a second table for a virtual-to-physical address translation entry for the received virtual address, wherein the first table is stored in the first memory device and the second table is stored in the second memory device.

Example 18 includes any example, wherein the received virtual address is received from at least one device communicatively coupled to the IOMMU using a Peripheral Component Interconnect express (PCIe) compatible interface.

Example 19 includes any example, wherein the at least one device comprises one or more of: a network interface card, graphics processor, video encoder or decoder, or accelerator device.

Example 20 includes any example, wherein a potential number of address translation entries in the second table is to exceed a maximum number of permitted address translation entries in the first table.

What is claimed is:

1. An apparatus comprising:
   a first memory device;
   a second memory device; and
   an input-output memory management unit (IOMMU) to:
      search for a virtual-to-physical address translation entry in a first table for a received virtual address;
      based on a virtual-to-physical address translation entry for the received virtual address not being present in the first table, search a second table for a virtual-to-physical address translation entry for the received virtual address, wherein the first table is stored in the first memory device, the second table is stored in the second memory device; and
      limit a number of entries permitted to be stored in the first table for a process identifier based on a priority level associated with the process identifier.

2. The apparatus of claim 1, wherein the IOMMU is to: based on a virtual-to-physical address translation entry for the received virtual address not being present in the second table, perform a page table walk to determine a virtual-to-physical address translation for the received virtual address.

3. The apparatus of claim 1, wherein the first table comprises an input-output (IO) translation lookaside buffer (IOTLB).

4. The apparatus of claim 1, wherein the IOMMU is to:
provide the virtual-to-physical address translation entry for the received virtual address for storage in the first table;
based on the first table being full, invalidate an entry in the first table and store the virtual-to-physical address translation entry for the received virtual address using the invalidated entry in the first table; and
store the invalidated entry in the second table.

5. The apparatus of claim 4, wherein the IOMMU is to limit a number of entries permitted to be stored in the first table and the second table for a source of the received virtual address based on a priority level of a source of the received virtual address.

6. The apparatus of claim 1, wherein the IOMMU is to:
receive a process identifier comprising a Process Address Space ID (PASID);
determine a memory address of the second table based at least on the PASID; and
access the second table based on the memory address.

7. The apparatus of claim 1, wherein the IOMMU is to:
receive a memory access request associated with the received virtual address and process identifier from a device, application, or virtual machine.

8. The apparatus of claim 1, comprising one or more of: a server, rack, or data center, the one or more of a server, rack, or data center to write data to a memory or storage device using the virtual-to-physical address translation or read data from the memory or storage device using the virtual-to-physical address translation.

9. A computer-implemented method comprising:
receiving a virtual address with a memory access request;
searching, by an input-output memory management unit (IOMMU), for a virtual-to-physical address translation entry in a first table for the received virtual address;
based on a virtual-to-physical address translation entry for the received virtual address not being present in the first table, searching, by the IOMMU, a second table for a virtual-to-physical address translation entry for the received virtual address, wherein the first table is stored in a different memory device than a memory device that stores the second table; and
limiting, by the IOMMU, a number of entries permitted to be stored in the first table for a process identifier based on a priority level associated with the process identifier.

10. The method of claim 9, comprising:
based on a virtual-to-physical address translation entry for the received virtual address not being present in the second table, performing, by the IOMMU, a page table walk to determine a virtual-to-physical address translation for the received virtual address.

11. The method of claim 9, wherein the first table comprises an IO translation lookaside buffer (IOTLB).

12. The method of claim 9, wherein the second table is stored in a memory device that is accessible to the IOMMU.

13. The method of claim 9, comprising:
providing the virtual-to-physical address translation entry for the received virtual address for inclusion in the first table;
based on the first table being full, invalidating an entry in the first table and storing the virtual-to-physical address translation entry for the received virtual address using the invalidated entry in the first table; and
storing a virtual-to-physical address translation for the invalidated entry in the second table.

14. The method of claim 13, comprising:
limiting a number of entries permitted to be stored in the first table and the second table for a source of the received virtual address based on a priority level of a source of the received virtual address.

15. The method of claim 9, comprising:
receiving a process identifier with the memory access request;
determining a memory address of the second table based at least on the process identifier; and
accessing the second table based on the determined memory address.

16. The method of claim 9, comprising:
receiving the memory access request from a device, application, or virtual machine.

17. A non-transitory computer-readable medium comprising instructions stored-thereon, that if executed by one or more processors of an input-output memory management unit (IOMMU), cause the one or more processors to:
search for a virtual-to-physical address translation entry in a first table for a received virtual address;
based on a virtual-to-physical address translation entry for the received virtual address not being present in the first table, search a second table for a virtual-to-physical address translation entry for the received virtual address, wherein the first table is stored in a first memory device and the second table is stored in a second memory device; and
limit a number of entries permitted to be stored in the first table for a process identifier based on a priority level associated with the process identifier.

18. The computer-readable medium of claim 17, wherein the received virtual address is received from at least one device communicatively coupled to the IOMMU using a Peripheral Component Interconnect express (PCIe) compatible interface.

19. The computer-readable medium of claim 18, wherein the at least one device comprises one or more of: a network interface card, graphics processor, video encoder or decoder, or accelerator device.

20. The computer-readable medium comprising instructions of claim 17, wherein a potential number of address translation entries in the second table is to exceed a maximum number of permitted address translation entries in the first table.

* * * * *